United States Patent [19]
Yamasita et al.

[11] Patent Number: 5,906,959
[45] Date of Patent: *May 25, 1999

[54] CATALYST FOR PURIFYING EXHAUST GAS

[75] Inventors: Koiti Yamasita, Susono; Mikio Murachi, Toyota; Masahiko Sugiyama, Mishima, all of Japan

[73] Assignee: Toyota Jidosha Kabushiki Kaisha, Toyota, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/684,482

[22] Filed: Jul. 19, 1996

[30] Foreign Application Priority Data

| Jul. 20, 1995 | [JP] | Japan | 7-184134 |
| Apr. 16, 1996 | [JP] | Japan | 8-094327 |
| Jul. 15, 1996 | [JP] | Japan | 8-184465 |

[51] Int. Cl.$^6$ .................................. B01J 23/58
[52] U.S. Cl. ..................... 502/328; 502/327; 502/331; 502/334
[58] Field of Search ................... 502/327, 331, 502/334, 328

[56] References Cited

U.S. PATENT DOCUMENTS

| 4,134,852 | 1/1979 | Volin | 252/472 |
| 4,522,706 | 6/1985 | Wheelock et al. | 208/121 |
| 4,959,339 | 9/1990 | Arai | 502/302 |
| 5,384,110 | 1/1995 | Muramatsu et al. | 423/239.1 |
| 5,439,865 | 8/1995 | Abe et al. | 502/333 |

FOREIGN PATENT DOCUMENTS

| 61-33232 | 2/1986 | Japan . |
| 62-277150 | 12/1987 | Japan . |
| 1 568 370 | 5/1980 | United Kingdom . |
| WO 92/01505 | 2/1992 | WIPO . |

OTHER PUBLICATIONS

L. Ben–Dor, et al. "The Growth Of Single Crystals of $Sr_4PtO_6$" Journal of Crystal Growth, vol. 64, 1983 pp. 395–396 North–Holland Publishing Company.

Y. Laligant, et al., "Synthesis and Single–Crystal Refinement Of $Ba_2Y_2CuPtO_8$.", Europhyics Letters, vol. 4, No. 9, pp. 1023–1029 (1987).

Database WPI, AN 88–016561 & JP–A–62 277 150, Dec. 2, 1987.

*Primary Examiner*—Bekir L. Yildirim
*Attorney, Agent, or Firm*—Oblon, Spivak, McClelland, Maier & Neustadt, P.C.

[57] ABSTRACT

This invention relates to a catalyst for purifying an exhaust gas using a complex oxide having good heat-resistant and a purification performance which does not undergo degradation, particularly in a lean atmosphere at a high temperature of about 1,000° C., by using the complex oxide containing platinum and at least one member of element selected from the group from an alkaline earth metal element and the Group IIIA element and, furthermore, by using at least one member of platinum complex oxides selected from the group of those Pt complex oxides expressed by the chemical structural formulas $X_4PtO_6$ (X=Ca, Sr, Ba, Mg), $X'_2Pt_2O_7$ (X'=Sc, La, Pr), $SrX''PtO_6$ (X''=Co, Ni, Cu), $Ba_2ZPtO_6$ (Z=Pr, Ce) and $Ba_8Y_3Pt_4O_{17.5}$.

8 Claims, No Drawings

CATALYST FOR PURIFYING EXHAUST GAS

BACKGROUND OF THE INVENTION

1. Field of the Invention

The present invention relates to a catalyst for purifying exhaust gas which entraps platinum into a complex oxide and comprises a complex oxide having a good heat-resistance performance even in a lean combustion atmosphere at a high temperature of not lower than 1000° C.

2. Description of the Prior Art

A catalyst for purifying an exhaust gas for automobiles, etc, according to the prior art uses a precious metal such as platinum, palladium and rhodium, either alone or in combination, as a catalytic component, and the catalytic component is generally supported by a catalytic support. Among them, however, rhodium is not abundant and is expensive. Palladium has better heat resistance than platinum but has remarkably lower resistance to poisoning by the lead in gasoline, or to phosphorus in a lubricating oil than platinum. Therefore, platinum which is more plentiful than rhodium becomes an essential component.

However, platinum causes the problems in that it is oxidized in a high temperature lean atmosphere, and that its surface area drops due to sintering and its activity as a catalytic component then drops remarkably.

Furthermore, an improvement in catalysts, for better heat resistance, has been required because the exhaust temperature has become higher so as to cope with stricter exhaust gas regulations such as the European step III regulations and the λ=1 regulations. For existing Pt/Al$_2$O$_3$ system catalysts, purification performance drops remarkably in a high temperature lean atmosphere, and they cannot satisfy such regulations. It is assumed that the drop of purification performance, too, results from sintering of platinum.

As a well-known technology in this field, the applicant of the present invention proposed a catalyst for purifying an exhaust gas which can prevent thermal degradation of Pt and its alloying and can improve the durability as well as the purification performance by using a perovskite type complex oxide between Pt and a lanthanoid element, or an alkaline earth metal element or its analogous complex oxide, as a catalyst for purifying an exhaust gas for an internal combustion engine, in Japanese Unexamined Patent Publication (Kokai) No. 62-277150. Although capable of drastically improving durability, etc, in comparison with the conventional catalysts, this catalyst is not free from the problem that the perovskite type complex oxide starts being decomposed in a region where the exhaust gas temperature exceeds 900° C. As described above, the exhaust gas temperature has drastically risen due to various kinds of exhaust gas regulations in recent years, and the development of a catalyst which can sufficiently purify the exhaust gas even in a region higher than 1,000° C. is required.

SUMMARY OF THE INVENTION

The present invention is directed to provide a catalyst having good heat-resistance for purifying an exhaust gas which enables platinum to prevent or drastically restrict sintering even in a high temperature lean atmosphere by entrapping platinum into the crystal of the complex oxide.

As a result of the efforts to prevent mutual sintering of the complex oxides having good heat-resistance, the present invention was found to be capable of providing a catalyst having good heat-resistance for purifying an exhaust gas and capable of restricting the decrease of a specific surface area of the complex oxide.

Also, as a result of the examination of a complex oxide having better heat resistance than a perovskite structure, it is a further object of the present invention to provide a catalyst having good heat-resistance, for purifying an exhaust gas which can be produced by a sol-gel method.

It is still another object of the present invention to provide a catalytic support which per se has good heat resistance and hardly reacts with the Pt complex oxide. On this point, it is believed that the reason why purification performance of the complex oxide having good heat resistance drops in the course of endurance running is because the alkaline earth element in the complex oxide reacts with the catalytic carrier, and forms complex oxides such as alkali earth metal-aluminates, silicates, etc, and the crystal structure of the complex oxide changes in the course of endurance running.

The gist of the present invention will be described as follows.

(1) A catalyst for purifying an exhaust gas characterized by using a complex oxide having good heat-resistance comprising platinum and at least one member selected from the group consisting of alkaline earth metal elements and Group IIIA elements.

(2) A catalyst for purifying an exhaust gas according to item (1), wherein the complex oxide having good heat-resistance comprises at least one member of a platinum complex oxide selected from the group of complex oxides expressed by chemical structural formulas X$_4$PtO$_6$, (X=Ca, Sr, Ba, Mg), X'$_2$Pt$_2$O$_7$ (X'=Sc, La, Pr), Sr$_3$X''PtO$_6$ (X=Co, Ni, Cu), Ba$_2$ZPtO$_6$ (Z=Pr, Ce) and Ba$_8$Y$_3$Pt$_4$O$_{17.5}$.

(3) A catalyst for purifying an exhaust gas according to item (1), wherein the complex oxide having good heat-resistance further comprises Cu.

(4) A catalyst for purifying an exhaust gas according to item (3), wherein the complex oxide having good heat-resistance comprises at least one member of platinum complex oxide selected from the group expressed by Ba$_2$Y$_2$Cu$_2$PtO$_8$, Ba$_2$Y$_2$CuPtO$_8$, Ba$_2$Y$_2$Cu$_2$PtO$_{10}$, Ba$_3$Y$_2$Cu$_2$PtO$_{10}$, Ba$_{1.3}$Sr$_{1.7}$Y$_2$Cu$_2$PtO$_{10}$, Ba$_2$Ho$_2$CuPtO$_8$, Ba$_3$Ho$_2$Cu$_2$PtO$_{10}$, Ba$_3$Er$_2$Cu$_2$PtO$_{10}$, and Ba$_2$Er$_2$Cu$_2$PtO$_{10}$.

(5) A catalyst for purifying an exhaust gas according to item (1) or (3), wherein a catalytic support oxide is mixed with the complex oxide having good heat-resistance.

(6) A catalyst for purifying an exhaust gas according to item (5), wherein the catalytic support oxide is at least one member selected from the group consisting of alumina, silica, titania, zirconia and ceria.

(7) A catalyst for purifying an exhaust gas according to item (5), wherein the catalytic support oxide is a complex oxide comprising each member selected from the group of alumina, silica, titania, zirconia and ceria and an alkaline earth metal element or a lanthanoid element.

(8) A process for producing a catalyst for purifying an exhaust gas according to item (1) or (3), wherein the complex oxide having good heat-resistance is produced by a sol-gel method.

(9) A process for producing a catalyst for purifying an exhaust gas according to item (8), wherein the process comprises the step of calcining, drying and calcination.

(10) A process for producing a catalyst for purifying an exhaust gas according to item (5), wherein a method of adding the catalytic support oxide is carried out by powder addition of oxide or solution addition of the metal ions of the catalytic support oxide.

DETAILED DESCRIPTION OF THE PREFERRED EMBODIMENT

According to the first aspect of the present invention, a catalyst for purifying an exhaust gas having good heat-resistance of not lower than 1,000° C. can be accomplished by constituting the catalyst with a complex oxide comprising platinum and at least one element of alkaline earth metal element or a lanthanoid element so as to entrap platinum into the crystal of the complex oxide.

In the second aspect of the present invention, Mg, Ca, Sr and Ba are used as the alkaline earth metal element, Sc, Y and the lanthanoids (La, Ce, Pr, etc) as the Group IIIA element and $Al_2O_3$, $SiO_2$, $TiO_2$, $ZrO_2$, $CeO_2$, etc., as the catalytic support oxide, and the catalytic support oxide is mixed with the complex oxide having good heat-resistance and can thus prevent sintering of the complex oxides due to their mutual contact. As a result, the decrease of the specific surface area of the complex oxides can be restricted, and the drop of the catalysis can be prevented.

Next, the technical features of the present invention will be explained below. First, the method of adding the catalytic support oxide is carried out by powder addition of oxide or by solution addition of the metal ions of the catalytic support oxide. These complex oxides are platinum complex oxides having good heat-resistance expressed by the following items (1) to (4) as the principal structures thereof.

(1) $X_4PtO_6$ (X=Ca, Sr, Ba, Mg), (2) $X'Pt_2O_7$ (X'=Sc, La, Pr); in this case, Sc, La and Pr from a pyrochlore series ($X'Pt_2O_7$).

(3) $Sr_3X''PtO_6$ (X''=Co, Ni, Cu); these compounds correspond to the compounds of $Sr_4PtO_6$ whose one Sr is substituted.

(4) $Ba_2ZPtO_6$ (Z=Pr, Ce),

Next, the method of securing the specific surface area of the complex oxide having good heat-resistance according to the present invention will be explained. Since the specific surface area of this complex oxide is proportional to the number of Pt ions existing on the surface (that is, surface area), the greater the specific surface area of the complex oxide, the better. As a method of increasing this specific surface area, the present invention prepares all the complex oxides by a sol-gel method. A vapor phase decomposition method may be also used besides this sol-gel method. By the way, the object of the addition of the catalytic support oxide in the present invention is primarily directed to prevent sintering of the Pt complex oxide.

In another embodiment of the invention, Ba(Sr), Cu, Pt, X (X=Y, lanthanoids, inclusive of the case where X does not exist), can be used as a Pt complex oxide having further improved durability for the Pt complex oxides $Ba_4PtO_6$, etc., described above. Further preferably, at least one of the platinum complex oxides expressed by $Ba_4CuPt_2O_9$, $Ba_2Y_2CuPtO_8$, $Ba_2Y_2Cu_2PtO_{10}$, $Ba_3Y_2Cu_2PtO_{10}$, $Ba_{1.3}Sr_{1.7}Y_2Cu_2PtO_{10}$, $Ba_2Ho_2CuPtO_8$, $Ba_3Ho_2Cu_2PtO_{10}$, $Ba_2Er_2CuPtO_8$, $Ba_3Er_2Cu_2PtO_{10}$, etc., is used.

In another embodiment of the invention, when the Pt complex oxide described above and $Al_2O_3$ are mixed, the alkaline earth metal element in the complex oxide and $Al_2O_3$ react and form alkaline earth metal-aluminates. Therefore, Pt precipitates during the endurance running, but the inventions according to claim 5 and 6 prevent this problem. This also means that the alkali earth metal-$SiO_2$, $TiO_2$ and $ZrO_2$ complex oxides are formed in the cases of $SiO_2$, $TiO_2$ and $ZrO_2$, too. Since the catalyst of the present invention not only has good heat-resistance but contains in advance the alkaline earth metal element, it does not easily react with the alkaline earth metal element in itself. As a result, durability of the catalyst can be improved.

In another embodiment of the invention, the catalytic support itself comprises a complex oxide. Because the reaction between the alkaline earth metal element in the Pt complex oxide and the catalytic support can be restricted, durability of the catalyst for purifying an exhaust gas can be improved. The heat-resistance of the catalyst support itself can be improved, too.

The catalytic support of complex oxide according to the present invention comprises $Al_2O_3$, $SiO_2$, $TiO_2$ or $ZrO_2$ and the alkaline earth metal element or the lanthanoid element. Its preferred composition ratio is X:M=1:0.3 to 1:20 and more preferably, X:M=1:0.5 to 1:4 (X=alkaline earth metal, lanthanoid, M=Al, Si, Ti, Zr).

Hereinafter, the present invention will be explained in further detail with reference to Examples thereof.

EXAMPLES

Example 1

This Example relates to a $Ba_4PtO_6/Al_2O_3$, catalyst. The method of preparing the catalyst of this Example was as follows. First, 20 g of $PtCl_4$ was dissolved in 200 g of ethanol to prepare an A1 solution. After 400 g of an ethanol solution (10 wt%) of Na ethoxide $C_2H_5ONa$ was added to this A1 solution, the mixed solution was refluxed for 5 hours in a nitrogen atmosphere to obtain a Pt alkoxide B1 solution. To this B1 solution was added 541 g of an ethanol solution (10 wt %) of a Ba ethoxide $Ba(OC_2H_5)$ so as to obtain a C1 solution. A gel-like precipitate was then obtained by adding 120 g of water to this C1 solution. After centrifugal separation and washing were repeated, the reaction product was dried for twenty-four hours at 120° C. and was calcined at 1100° C. for 5 hours to obtain D1 powder. The catalyst of Example 1 was obtained by sufficiently mixing 2.7 g of this D1 powder and 47.3 g of $\gamma$-$Al_2O_3$ powder.

Example 2

This Example relates to a $Ca_4PtO_6/Al_2O_3$ catalyst. The method of preparing the catalyst in this Example was as follows. First, 37.3 g of $PtCl_4$ was dissolved in 370 g of ethanol to prepare an A2 solution, and 310 g of an ethanol solution (10 wt %) of Na ethoxide $C_2H_5ONa$ was added to this A2 solution. The mixed solution was refluxed in a nitrogen atmosphere for 5 hours to obtain a Pt alkoxide B2 solution. To this B2 solution was added 577 g of an ethanol solution (10 wt %) of Ca ethoxide Ca $(OC_2H_5)_2$ to obtain a C2 solution. Next, a gel-like precipitate was obtained by adding 239 g of deionized water to this C2 solution. After centrifugal separation and washing were repeated, the reaction product was dried for twenty-four hours at 120° C. and was calcined at 1100° C. for 5 hours to obtain D2 powder. The catalyst of Example 2 was obtained by sufficiently mixing 1.45 g of this D2 powder and 48.55 g of $\gamma$/-$Al_2O_3$ powder.

Example 3

This Example relates to $La_2Pt_2O_7/ZrO_2$ catalyst. The method of preparing the catalyst of this Example was as follows. First, 43.1 g of $PtCl_4$ was dissolved in 430 g of ethanol to obtain an A3 solution. To this A3 solution was added 400 g of an ethanol solution (10 wt %) of Na ethoxide $C_2H_5ONa$, and the mixed solution was refluxed for 5 hours in a nitrogen atmosphere to obtain a Pt alkoxide B3 solution. 350 g of an ethanol solution (10 wt %) of La ethoxide $La(OC_2H_5)_3$ was mixed with this B3 solution to obtain a C3 solution. A gel-like precipitate was then obtained by adding 160 g of deionized water to this C3 solution. After centrifugal separation and washing were repeated, the reaction product was dried at 120° C. for twenty-four hours and was then calcined at 1100° C. for 5 hours to obtain D3 powder. The catalyst of Example 3 was obtained by sufficiently mixing 1.25 g of this D3 powder and 48.75 g of $ZrO_2$ powder.

Example 4

This Example relates to $Sr_3NiPtO_6/ZrO_2$ catalyst. The method of preparing the catalyst of this Example was as follows. First, 27.5 g of $PtCl_4$ and 10.6 g of $NiCl_2$ were dissolved in 400 g of ethanol to obtain an A4 solution. To this A4 solution was added 200 g of an ethanol solution (10 wt %) of Na ethoxide $C_2H_5ONa$, and the mixed solution was refluxed for 5 hours in a nitrogen atmosphere to obtain a Pt alkoxide B4 solution. Next, 435 g of an ethanol solution (10 wt %) of Sr ethoxide $Sr(OC_2H_5)$, was added to this B4 solution to obtain a C4 solution. A gel-like precipitate was then obtained by adding 180 g of deionized water to this C4 solution. After centrifugal separation and washing were repeated, the reaction product was dried at 120° C. for twenty-four hours and was then calcined at 1100° C. for 5 hours to obtain D4 powder. The catalyst of Example 4 was obtained by sufficiently mixing 1.97 g of this D4 powder and 48.03 g of $ZrO_2$ powder.

Example 5

This Example relates to a $Ba_2PrPtO_6/ZrO_2$ catalyst. The method of preparing the catalyst of this Example was as follows. First, 23.9 g of $PtCl_4$ and 26.4 g of $PtCl_3 \cdot 7H_2O$ were dissolved in 500 g of ethanol to obtain an A5 solution. To this A5 solution was added 338 g of an ethanol solution (10 wt %) of Na ethoxide $C_2H_5ONa$, and the mixed solution was refluxed for 5 hours in a nitrogen atmosphere to obtain a Pt alkoxide B5 solution. Next, 322 g of an ethanol solution (10 wt %) of Ba ethoxide $Ba(OC_2H_5)_2$ to this B5 solution to obtain a C5 solution. A gel-like precipitate was obtained by adding 153 g of deionized water to this C5 solution. After centrifugal separation and washing were repeated, the reaction product was dried at 120° C. for twenty-four hours and was then calcined at 1100° C. for 5 hours to obtain D5 powder. The catalyst of Example 5 was obtained by sufficiently mixing 2.26 g of this D5 powder and 47.74 g of $ZrO_2$ powder.

Example 6

This Example relates to $Ba_4PtO_6$ catalyst. The catalyst of Example 6 was D1 powder of Example 1 previously mentioned.

Comparative Example 1

This Comparative Example relates to $Pt/Al_2O_3$ catalyst. The method of preparing the catalyst of this Comparative Example was as follows. First, 50 g of $\gamma$-$Al_2O_3$ (specific surface area 150 m$^2$/g) was placed into 313 g of an aqueous dinitrodiamine Pt solution (0.2 wt % in terms of Pt), and the mixture was stirred. After water was evaporated, the reaction product was dried at 120° C. for twenty-four hours and was then calcined at 500° C. for 1 hour to obtain the catalyst of Comparative Example 1.

Comparative Example 2

This Comparative Example 2 relates to $LaCo_{0.9}Pt_{0.3}O_3$ catalyst. The method of preparing the catalyst of this Comparative Example was as follows. First, 65.0 g of $La(NO_3)_3 \cdot 6H_2O$ was dissolved in 150 ml of deionized water, and 34.7 g of $Co(CH_3COO)_2 \cdot 4H_2O$ was dissolved in 150 ml of deionized water. Next, 75.7 g of citric acid was dissolved in 360 ml of deionized water. These three kinds of aqueous solutions were mixed and furthermore, 58.6 g of an aqueous dinitrodiamine Pt solution (5 wt % in terms of Pt) was added and mixed. This mixed aqueous solution was evaporated, dried and solidified (for about 4 hours) over a bath at 80° C. inside an evaporator under a reduced pressure. Next, while pressure reduction was being done using a vacuum pump, the reaction product was heated to 350° C. and was then calcined at 750° C. for 3 hours to obtain the catalyst of Comparative Example 2.

When each catalyst of Examples 1 to 6 and Comparative Examples 1 and 2 was analyzed by X-ray diffraction, the diffraction peak of the Pt metal could not be observed in all of the catalysts.

Next, the method of evaluating performance of the catalysts of Examples 1 to 6 and Comparative Examples 1 and 2 will be explained.

After each of the catalysts was pressed by CIP (cold isostatic press), it was pulverized and was shaped to 1.7 to 1.0 mm. Before the performance evaluation, each testpiece was subjected to endurance treatment at 1,000° C. for 10 hours. Table 1 represents the endurance treatment gas composition (corresponding to air-fuel ratio A/F=16).

TABLE 1

| $O_2$ | CO | $C_3H_6$ | NO | $CO_2$ | $H_2O$ | $N_2$ |
|---|---|---|---|---|---|---|
| 1.50% | 0.10% | 0.057% | 0.25% | 14.5% | 10% | balance |

Next, the catalytic conversion efficiency was measured by using a normal pressure flow type reactor. Table 2 represents the composition of the measuring gas of catalytic conversion efficiency (corresponding to a stoichiometric composition) at this time.

TABLE 2

| $O_2$ | CO | $C_3H_6$ | NO | $CO_2$ | $H_2O$ | $N_2$ |
|---|---|---|---|---|---|---|
| 0.30% | 0.20% | 0.067% | 0.20% | 14.5% | 10% | balance |

The flow rate of the measuring gas of catalytic conversion efficiency at this time was 5 l/min. The weight of the catalyst of Examples 1 to 6 and Comparative Example 1 was 2.0 g. The weight of the catalyst of Comparative Example was 6.17 g so that the Pt weight contained in the catalyst became equal to that of Example 6.

The catalyst bed temperature was set to 500° C., 450° C., 350° C., 300° C. and 250° C., and the catalytic conversion efficiency under the steady state was measured at each of these temperatures. The definition of the catalytic conversion efficiency this time was as follows.

catalytic conversion efficiency=[(inlet gas concentration−outlet gas concentration)/inlet gas concentration]×100

Next, the temperature at which the catalytic conversion efficiency reached 50% (which will be hereinafter called "THC-$T_{50}$" ($C_3H_6$ component), "NO-$T_{50}$" (NO component) was determined by plotting the catalyst bed temperature and the catalytic conversion efficiency. The results were altogether tabulated in Table 3.

TABLE 3

| catalyst | Pt amount | HC-$T_{50}$ | NO-$T_{50}$ |
|---|---|---|---|
| Example 1 | $Ca_4PtO_6/Al_2O_3$ | 1.25 wt % | 399° C. | 388° C. |
| Example 2 | $Ba_4PtO_6/Al_2O_3$ | " | 410° C. | 417° C. |
| Example 3 | $La_2Pt_2O_7/ZrO_2$ | " | 398° C. | 382° C. |
| Example 4 | $Sr_3NiPtO_6/ZrO_2$ | " | 414° C. | 422° C. |
| Example 5 | $Ba_2PrPtO_6/ZrO_2$ | " | 411° C. | 424° C. |
| Example 6 | $Ba_4PtO_6$ | 23.2 wt % | 350° C. | 348° C. |
| Comp. Example 1 | $Pt/Al_2O_3$ | 1.25 wt % | 445° C. | 463° C. |
| Comp. Example 2 | $LaCo_{0.9}Pt_{0.1}O_3$ | 7.52 wt % | 404° C. | 421° C. |

It can be understood clearly from Examples 1 to 6 that the catalysts according to the present invention had a lower THC purification temperature and a lower NO purification temperature after endurance treatment than the conventional catalyst according to Comparative Example 1.

In the catalyst according to the Comparative Example 1, the higher the durability temperature, the more its sintering was promoted. Sintering was particularly remarkable in the high temperature oxidizing atmosphere, and it was extremely difficult to prevent this sintering. As an example of measurement of the Pt particle size of this catalyst of Comparative Example 1 after endurance treatment, it was as great as about 55 nm when measured by a half value width method of X-ray diffraction described already. On the other hand, the perovskite type complex oxide of the aforementioned reference such as the catalyst of Comparative Example 2 is expressed by the general formula $ABO_3$, where A is a member selected from the group consisting of the lanthanoid elements and the alkaline earth metal elements, and B is platinum alone or a mixture of platinum and a transition metal. Further, the catalytic component includes complex oxides having a so-called "perovskite type structure analogous structure" such as an ilmenite type, a $BaNiO_3$ type, a $K_2NiF_4$ type, and so forth. In these complex oxides, too, Pt is entrapped into the structure. However, at a temperature of 900° C., the structure itself of these complex oxides is decomposed, so that Pt is extruded and can no longer exist stably.

In the catalysts according to the present invention, however, the diffraction peak of the Pt metal cannot be observed by X-ray diffraction even after endurance treatment at 1,000° C., and the catalysts keep stably the form of the complex oxides. This presumably improves extremely highly durability performance of the catalysts of the present invention.

Example 7

This example relates to $Ba_4PtO_6/BaO-Al_2O_3$ (Ba:Al=1:2) catalyst.

First, 26.9 g of $Ba(OC_3H_7)$, and 80 g of $Al(OC_3H_7)_3$ were dissolved in 350 g of isopropanol and the mixed solution was heated and refluxed at 70° C. for 3 hours over a water bath to prepare an A7 solution. While the A7 solution was being stirred, 56 g of deionized water was added little by little to obtain a B7 precipitate. After being aged at 70° C. for 5 hours, the B7 precipitate was dried under reduced pressure. The dried product was treated at 500° C. for 1 hour in a nitrogen stream. Subsequently, the product was treated at 1,100° C. for 5 hours to obtain C7 powder of a complex oxide.

An E7 solution was prepared by dissolving 20 g of $PtCl_4$ in 200 g of ethanol. After 400 g of an ethanol solution (10 wt %) of $C_2H_5ONa$ was added to the E7 solution described above, the mixture was refluxed for 5 hours to obtain a F7 solution. Next, 541 g of an ethanol solution (10 wt %) of $Ba(OC_2H_5)_2$ was added to the F7 solution to obtain a G7 solution. 120 g of deionized water was added to the G6 solution to obtain a gel-like precipitate. After centrifugal separation and washing were repeated, the precipitate was dried at 120° C. for twenty-four hours, and was treated at 1,000° C. for 5 hours in air to obtain H7 powder.

The catalyst of Example 7 was obtained by sufficiently mixing 47.3 g of C7 powder and 2.7 g of H7 powder.

Example 8

This Example relates to $Ba_4PtO_6/BaO-Al_2O_3$ (Ba:Al=1:12) catalyst.

First, 8.9 g of $Ba(OC_3H_7)_3$ and 80 g of $Al(OC_3H_7)_3$ were dissolved in 507 g of isopropanol, and the mixture was heated and refluxed at 70° C. for 3 hours over a water bath to prepare an A8 solution. While the A8 solution was being stirred, 89 g of deionized water was added little by little to obtain a B8 precipitate. After being aged at 70° C. for 5 hours, the B8 precipitate was dried under reduced pressure. The dried product was treated at 500° C. for 1 hour in a nitrogen stream. Subsequently, the product was treated at 1,100° C. for 5 hours in air to obtain C8 powder of a complex oxide.

The catalyst of Example 8 was obtained by sufficiently mixing 47.3 g of C8 powder and 2.7 g of H7 powder.

Example 9

This Example relates to $Sr_3CoPtO_6/BaO-Al_2O_3$ (Ba:Al=1:2) catalyst.

First, 27.5 g of $PtCl_4$ and 10.6 g of $CoCl_2$ were dissolved in 400 g of ethanol to prepare an E9 solution. Next, 200 g of an ethanol solution (10 wt %) of $C_2H_5ONa$ was added to the E9 solution and the mixed solution was refluxed for 5 hours in a nitrogen atmosphere to prepare a F9 solution. A G9 solution was prepared by mixing 435 g of an ethanol solution (10 wt %) of $Sr(OC_2H_5)$, to the F9 solution. Next, 180 g of deionized water was added to the G9 solution to obtain a precipitate. After centrifugal separation and washing were repeated, the precipitate was dried at 120° C. for twenty-four hours and was then calcined at 500° C. for 3 hours to obtain H9 powder.

The catalyst of Example 9 was obtained by sufficiently mixing 48.05 g of C7 powder and 1.95 g of H9 powder.

Example 10

This Example relates to $Ba_4PtO_6/MgO-Al_2O_3$ (Mg:Al=1:2) catalyst.

First, 8.5 g of $Mg(OC_3H_7)_3$ and 144 g of $Al(OC_3H_7)_3$ were dissolved in 633 g of isopropanol and the mixed solution was heated and refluxed at 70° C. for 3 hours over a water bath to prepare an A10 solution. While the A10 solution was being stirred, 101 g of deionized water was added little by little to obtain a B10 precipitate. After being aged at 70° C. for 5 hours, the B10 precipitate was dried under reduced pressure. The dried product was then treated at 500° C. for one hour in a nitrogen stream. Subsequently, the product was treated at 110° C. for 5 hours in air to obtain C10 powder of a complex oxide.

The catalyst of Example 10 was obtained by sufficiently mixing 47.3 g of C10 powder and 2.7 g of H7 powder.

Example 11

This Example relates to $La_2Pt_2O_7/La_2O_3-Al_2O_3$ (La:Al= 1:1) catalyst.

First, 64.1 g of $La(OC_1H_5)_3$ and 47.8 g of $Al(OC_3H_7)_3$ were dissolved in 280 g of isopropanol and the mixed solution was heated and refluxed at 70° C. for 3 hours over a water bath to prepare an A11 solution. While the A11 solution was being stirred, 51 g of deionized water was added little by little to obtain a B11 precipitate. After being aged at 70° C. for 5 hours, the B11 precipitate was dried under reduced pressure. The dried product was treated at 500° C. for 1 hour in a nitrogen stream. Subsequently, the product was treated at 1,100° C. for 5 hours in air to obtain C11 powder of a complex oxide.

43.1 g of $PtCl_4$ was dissolved in 430 g of ethanol to prepared an E11 solution, and 400 g of an ethanol solution (10 wt %) of $C_2H_5ONa$ was added to this E11 solution. The mixed solution was refluxed for 5 hours to prepare a F11 solution. Further, 350 g of an ethanol solution (10 wt %) of $La(OC_2H_5)_3$ was mixed with this F11 solution to prepare a G11 solution. Next, 160 g of deionized water was added to the G11 solution to obtain a precipitate. After centrifugal separation and washing were repeated, the precipitate was dried at 120° C. for twenty-four hours and was then calcined at 500° C. for 3 hours to obtain H11 powder.

The catalyst of this Example 11 was obtained by sufficiently mixing 48.75 g of C11 powder and 1.25 g of H11 powder.

Example 12

This Example relates to an $Sr_3CoPtO_6/CaO-SiO_2$ (Ca:Si= 1:0.3) catalyst.

First, 85.5 g of $Ca(OC_2H_5)$ and 45.6 g of $Si(OC_2H_5)_4$ were dissolved in 526 g of isopropanol, and the mixed solution was heated and refluxed at 70° C. for 3 hours over a water bath to prepare an A12 solution. While the A12 solution was being stirred, 79 g of deionized water was added little by little to obtain a B12 precipitate. After being aged at 70° C. for 5 hours, the precipitate was dried under reduced pressure. The dried product was treated at 500° C. for 1 hour in a nitrogen stream. Subsequently, the product was treated at 1,100° C. for 5 hours in air to obtain C12 powder of a complex oxide.

The catalyst of Example 12 was obtained by sufficiently mixing 48.05 g of C12 powder and 1.95 g of H9 powder.

Example 13

This Example relates to $Sr_3CoPtO_6/BaO-TiO_2$ (Ba:Ti= 1:1) catalyst.

First, 48.7 g of $Ba(OC_2H_5)_2$ and 48.9 g of $Ti(OC_2H_5)$ were dissolved in 257 g of isopropanol, and the mixed solution was heated and refluxed at 70° C. for 3 hours over a water bath to prepare an A13 solution. While the A13 solution was being stirred, 47 g of deionized water was added little by little to obtain a B13 precipitate. After being aged at 70° C. for 5 hours, the precipitate was dried under reduced pressure. The dried product was treated at 500° C. for 1 hour in a nitrogen stream. Subsequently, the product was treated at 1,100° C. for 5 hours to obtain C13 powder of a complex oxide.

The catalyst of Example 13 was obtained by sufficiently mixing 48.0 g of C13 powder and 1.25 g of H9 powder.

Example 14

This Example relates to $Sr_3CoPtO_6/SrO-ZrO_2$ (Sr:Zr=1:1) catalyst.

First, 39.1 g of $Sr(OC_2H_5)_2$ and 59.8 g of $Zr(OC_2H_5)_4$ were dissolved in 257 g of isopropanol, and the mixed solution was heated and refluxed at 70° C. for 3 hours to prepare an A14 solution. While the solution was being stirred, 47 g of deionized water was added little by little to obtain a B14 precipitate. After being aged at 70° C. for 5 hours, the precipitate was dried under reduced pressure. The dried product was treated at 500° C. for 1 hour in a nitrogen atmosphere. Subsequently, the product was treated at 1,100° C. for 5 hours in air to obtain C14 powder of a composite oxide.

The catalyst of Example 14 was obtained by sufficiently mixing 48.05 g of C14 powder and 1.25 g of H9 powder.

Example 15

This Example relates to $Ba_4PtO_6/BaO-Al_2O_3$ (Ba:Al= 1:0.2) catalyst.

The catalyst of Example 15 was obtained by sufficiently mixing 47.3 g of $\gamma-Al_2O_3$ and 2.7 g of H7 powder.

Example 16

This Example relates to $Ba_4PtO_6/BaO-Al_2O_3$ (Ba:Al= 1:25) catalyst.

The catalyst of Example 16 was obtained by sufficiently mixing 47.3 g of $\gamma-Al_2O_3$ and 2.7 g of H7 powder.

Example 17

This Example relates to $Sr_3CoPtO_6/Al_2O_3$ catalyst.

The catalyst of Example 17 was obtained by sufficiently mixing 48.05 g of $\gamma-Al_2O_3$ and 1.95 g of H9 powder.

Example 18

This Example relates to $Sr_3CoPtO_6/SiO_2$ catalyst.

The catalyst of Example 18 was obtained by sufficiently mixing 48.05 g of $SiO_2$ and 1.95 g of H9 powder.

Example 19

This Example 19 relates to $Sr_3CoPtO_6/TiO_2$ catalyst.

The catalyst of Example 19 was obtained by sufficiently mixing 48.05 g of $TiO_2$ and 1.95 g of H9 powder.

Example 20

This Example 20 relates to $Sr_3CoPtO_6/ZrO_2$ catalyst.

The catalyst of Example 20 was obtained by sufficiently mixing 48.05 g of $ZrO_2$ and 1.95 g of H9 powder.

Performance evaluation of the catalysts of Examples 7 to 20 was subjected in the same way as in Examples 1 to 6 and Comparative Examples 1 and 2. The results were altogether tabulated in Table 4.

TABLE 4

| catalyst | | Pt amount | HC-$T_{50}$ | NO-$T_{50}$ |
|---|---|---|---|---|
| Example 7 | $Ba_4PtO_6$/BaO—$Al_2O_3$ (Ba:Al = 1:2) | 1.25 wt % | 360° C. | 354° C. |
| Example 8 | $Ba_4PtO_6$BaO—$Al_2O_3$ (Ba:Al = 1:12) | " | 371° C. | 361° C. |
| Example 9 | $Sr_3CoPtO_6$/BaO—$Al_2O_3$ (Ba:Al = 1:2) | " | 378° C. | 370° C. |
| Example 10 | $Ba_4PtO_6$/MgO—$Al_2O_3$ (Mg:Al = 1:2) | " | 365° C. | 352° C. |
| Example 11 | $La_2Pt_2O_7$/$La_2O_3$—$Al_2O_3$ (La:Al = 1:1) | " | 354° C. | 343° C. |
| Example 12 | $Sr_3CoPtO_6$/CaO—$SiO_2$ (Ca:Si = 1:0.3) | " | 387° C. | 383° C. |
| Example 13 | $Sr_3CoPtO_6$/BaO—$TiO_2$ (Ba:Ti = 1:1) | " | 379° C. | 374° C. |
| Example 14 | $Sr_3CoPtO_6$/SrO—$ZrO_2$ (Sr:Zr = 1:1) | " | 384° C. | 375° C. |
| Example 15 | $Ba_4PtO_6$/BaO—$Al_2O_3$ (Ba:Al = 1:0.2) | " | 423° C. | 413° C. |
| Example 16 | $Ba_4PtO_6$/BaO—$Al_2O_3$ (Ba:Al = 1:25) | " | 402° C. | 393° C. |
| Example 17 | $Sr_3CoPtO_6$/$Al_2O_3$ | " | 407° C. | 400° C. |
| Example 18 | $Sr_3CoPtO_6$/$SiO_2$ | " | 436° C. | 421° C. |
| Example 19 | $Sr_3CoPtO_6$/$TiO_2$ | " | 421° C. | 410° C. |
| Example 20 | $Sr_3CoPtO_6$/$ZrO_2$ | " | 415° C. | 409° C. |

The following is obvious from Table 4 for Examples 7 to 14.

When the complex oxide according to the present invention is used as the catalytic support of the precious metal complex oxide catalyst, both the THC purification temperature and the NO purification temperature can be lowered more greatly than those of the oxides ($Al_2O_3$, $SiO_2$, $TiO_2$, $ZrO_2$) according to the prior art.

A preferred composition ratio capable of reducing the THC purification temperature and the No purification temperature after endurance treatment is X:M=1:0 to 1:20 (where X is the alkaline earth metal or the lanthanoids and M is Al, Si, Ti and Zr). In the cases of Examples 1 and 17 to 20, the existence of the Ba-aluminates, the Sr-aluminates, the Sr-silicates, etc., can be observed by XRD analysis after endurance treatment. These compounds are formed as the result of the reaction between the precious metal complex oxide and the catalytic support oxide. As a result, the precious metal complex oxide becomes unstable and presumably becomes more likely to be sintered or to suffer structural break-down. In other words, in the complex oxide catalytic support according to the present invention, those metal elements which are likely to be entrapped into the catalytic support oxides according to the prior art are in advance made complex. In consequence, the reaction between the precious metal complex oxide and the catalytic support oxide can be restricted, so that durability can be improved.

Example 21

This Example relates to a $Ba_8Y_3Pt_4O_{17.5}$/$Al_2O_3$ catalyst. First, 37.5 g of $Ba(OC_2H_5)_2$, 13.9 g of $Y(OC_2H_5)_3$ and 32.4 g of $Pt(C_5H_8O_2)_2$ were dissolved in 370 g of isopropanol, and the mixed solution was refluxed at 70° C. for 3 hours on a water bath to prepare an A21 solution. While this A21 solution was being stirred, 31 g of deionized water was added little by little to obtain a B21 precipitate. After being aged at 70° C. for 5 hours, the B21 precipitate was dried under reduced pressure. The resulting dried product was treated at 500° C. for 1 hour in a nitrogen stream. Subsequently, the product was treated at 1,000° C. for 5 hours in air to obtain C21 powder of complex oxide.

The catalyst of Example 21 was obtained by sufficiently mixing 1.95 g of C21 powder and 48.05 g of γ-$Al_2O_3$.

Example 22

This Example relates to $Ba_4CuPt_2O_9$/$Al_2O_3$ catalyst.

First, 39.6 g of $Ba(OC_2H_5)_2$, 11.4 g of $Cu(C_5H_8O_2)_2$ and 34.3 g of $Pt(C_5H_8O_2)_2$ were dissolved in 366 g of isopropanol, and the mixed solution was refluxed at 70° C. for 3 hours over a water bath to prepare an A22 solution. While the A22 solution was being stirred, 28 g of deionized water was added little by little to obtain a B22 precipitate. After being aged at 70° C. for 5 hours, the B22 precipitate was dried under reduced pressure. The dried product was treated at 500° C. for 1 hour in a nitrogen stream. Subsequently, the product was treated at 1,000° C. for 5 hours in air to obtain C22 powder of complex oxide.

The catalyst of Example 22 was obtained by sufficiently mixing 1.84 g of C22 powder and 48.26 g of γ-$Al_2O_3$.

Example 23

This Example relates to $Ba_2Y_2CuPtO_8$/$Al_2O_3$ catalyst.

First, 27.1 g of $Ba(OC_2H_5)$, 26.7 g of $Y(OC_2H_5)_3$, 15.6 g of $Cu(C_5H_8O_2)_2$ and 23.4 g of $Pt(C_5H_8O_2)_2$ were dissolved in 429 g of isopropanol, and the mixed solution was refluxed at 70° C. for 3 hours over a water bath to prepare an A23 solution. While the A23 solution was being stirred, 34 g of deionized water was added little by little to obtain a B23 precipitate. After being aged at 70° C. for 5 hours, the B23 precipitate was dried under reduced pressure. The dried product was treated at 500° C. for 1 hour in a nitrogen stream. Subsequently, the product was treated at 1,000° C. for 5 hours in air to obtain C23 powder of complex oxide.

The catalyst of Example 23 was obtained by sufficiently mixing 2.68 g of C23 powder and 48.32 g of γ-$Al_2O_3$.

Example 24

This Example relates to a $Ba_{1.3}Sr_{1.7}Y_2Cu_2PtO_{10}$/$Al_2O_3$ catalyst.

First, 23.1 g of $Ba(OC_2H_5)_2$, 15.3 g of $Sr(OC_2H_5)_2$, 22.7 g of $Y(OC_2H_5)_3$, 26.5 g of $Cu(C_5H_2O_2)_2$ and 19.9 g of $Pt(C_5H_8O_2)_2$ were dissolved in 486 g of isopropanol, and the mixed solution was refluxed at 70° C. for 3 hours over a water bath to prepare an A24 solution. While the solution was being stirred, 37 g of deionized water was added little by little to obtain a B24 precipitate. After being aged at 70° C. for 5 hours, the B24 precipitate was dried under reduced pressure. The dried product was treated at 500° C. for 1 hour in a nitrogen stream. Subsequently, the product was treated at 1,000° C. for 5 hours to obtain complex oxide C24 powder.

The catalyst of Example 24 was obtained by sufficiently mixing 3.16 g of C24 powder and 46.84 g of γ-$Al_2O_3$.

Example 25

This Example relates to a $Ba_2Ho_2CuPtO_8/Al_2O_3$ catalyst.

First, 22.9 g of $Ba(OC_2H_5)_2$, 13.2 g of $Cu(C_5H_8O_2)_2$ and 19.8 g of $Pt(C_5H_8O_2)_2$ were dissolved in 363 g of isopropanol, and the mixed solution was refluxed at 70° C. for 2 hours to prepare an A25 solution. While the A25 solution was being stirred, 22.3 g of $Ho(NO_3)_3 \cdot 5H_2O$ was added, and the mixed solution was refluxed at 70° C. for 2 hours over a water bath to prepare a D25 solution. Next, 29 g of deionized water was added little by little to the D25 solution to obtain a B25 precipitate. After being aged at 70° C. for 5 hours, the precipitate was dried under reduced pressure. The dried product was treated at 500° C. for 1 hour in a nitrogen stream. Subsequently, the product was treated at 1,000° C. for 1 hour in air to obtain complex oxide C25 powder.

The catalyst of Example 25 was obtained by sufficiently mixing 3.18 g of C25 powder and 46.82 g of $\gamma$-$Al_2O_3$.

Example 26

This Example relates to a $Ba_2Er_2CuPtO_8/Al_2O_3$ catalyst.

First, 20.6 g of $Ba(OC_2H_5)_2$, 11.9 g of $Cu(C_5H_8O_2)_2$ and 17.8 g of $Pt(C_5H_8O_2)_2$ were dissolved in 435 g of isopropanol, and the mixed solution was refluxed at 70° C. for 2 hours over a water bath to prepare an A26 solution. While the A26 solution was being stirred, 41.8 g of $Er(NO_3)_3 \cdot 6H_2O$ was added, and the mixed solution was refluxed at 70° C. for 2 hours over a water bath to prepare a B26 solution. Next, 33 g of deionized water was added little by little to the D26 solution to obtain a C26 precipitate. After being aged at 70° C. for 5 hours, the C26 precipitate was dried under reduced pressure. The dried product was treated at 500° C. for 1 hour in a nitrogen stream. Subsequently, the product was treated at 1,000° C. for 5 hours to obtain complex oxide D26 powder.

The catalyst of Example 26 was obtained by sufficiently mixing 3.53 g of D26 powder and 46.47 g of $\gamma$-$Al_2O_3$.

Next, performance evaluation of the catalysts of Examples 21 to 26 and Comparative Example 1 was subjected in the same way as in Examples 1 to 6 and Comparative Examples 1 and 2. The results were altogether tabulated in Table 5.

TABLE 5

| catalyst | | Pt amount | HC-$T_{50}$ | NO-$T_{50}$ |
|---|---|---|---|---|
| Example 21 | $Ba_8Y_3Pt_4O_{17.5}/Al_2O_3$ | 1.25 wt % | 393° C. | 382° C. |
| Example 22 | $Ba_4CuPt_2O_9/Al_2O_3$ | " | 414° C. | 405° C. |
| Example 23 | $Ba_2Y_2CuPtO_8/Al_2O_3$ | " | 402° C. | 391° C. |
| Example 24 | $Ba_{1.3}Sr_{1.7}Y_2Cu_2PtO_{10}/Al_2O_3$ | " | 398° C. | 388° C. |
| Example 25 | $Ba_2Ho_2CuPtO_8/Al_2O_3$ | " | 407° C. | 399° C. |
| Example 26 | $Ba_2Er_2CuPtO_8/Al_2O_3$ | " | 404° C. | 396° C. |
| Comp. Example 1 | $Pt/Al_2O_3$ | " | 445° C. | 463° C. |

The following is obvious from Table 5 for Examples 21 to 26.

When the complex oxide according to the present invention is used for the precious metal complex oxide catalyst, the THC purification temperature and the NO purification temperature after durability use can be lowered more greatly than the oxides ($Al_2O_3$, $SiO_2$, $TiO_2$, $ZrO_2$) according to the prior art.

Since the catalyst for purifying exhaust gas according to the present invention achieves high temperature stability by entrapping platinum into the crystal of the complex oxide, it has durability capable of withstanding the use at a temperature not lower than 1,000° C. Further, sintering due to the mutual contact of the complex oxides having good heat resistance can be prevented by mixing the catalytic support oxide with the complex oxide having good heat resistance, and the decrease of the specific surface area of the complex oxide having good heat resistance can be restricted. Accordingly, durability can be further improved.

We claim:

1. A catalyst for purifying an exhaust gas, comprising at least one complex oxide expressed by chemical structural formula $Ba_8Y_3Pt_4O_{17.5}$.

2. A process for producing a catalyst for purifying an exhaust gas accordingu to claim 1, wherein said complex oxide having good heat-resistance is produced by a sol-gel method.

3. A process for producing a catalyst for purifying an exhaust gas according to claim 2, wherein said process comprises the step of calcining, drying and calcination.

4. A catalyst for purifying an exhaust gas, comprising at least one complex oxide selected from the group consisting of $Ba_4CuPt_2O_9$, $Ba_2Y_2CuPtO_8$, $Ba_2Y_2Cu_2PtO_9$, $Ba_3Y_2Cu_2PtO_{10}$, $Ba_{1.3}Sr_{1.7}Y_2Cu_2PtO_{10}$, $Ba_2Ho_2CuPtO_8$, $Ba_3Ho_2Cu_2PtO_{10}$, $Ba_2Er_2CuPtO_8$, and $Ba_3Er_2Cu_2PtO_{10}$.

5. The catalyst for purifying an exhaust gas according to claim 1, wherein a catalytic support oxide is mixed with said complex oxide.

6. A process for producing a catalyst for purifying an exhaust gas according to claim 5, wherein a method of adding said catalytic support oxide is carried out by powder addition of oxide or solution addition of the metal ions of the catalytic support oxide.

7. The catalyst for purifying an exhaust gas according to claim 5, wherein said catalyst support oxide is at least one member selected from the group consisting of alumina, silica, titania, zirconia and ceria.

8. The catalyst for purifying an exhaust gas according to claim 5, wherein said catalytic support oxide is a complex oxide comprising a member selected from the group of alumina, silica, titania, zirconia and ceria, and an alkaline earth metal element or a lanthanoid element.

\* \* \* \* \*